SODIUM SILICATE

John H. Wills, Cheyney, Pa., assignor to Philadelphia Quartz Company, Philadelphia, Pa.
No Drawing. Continuation-in-part of application Ser. No. 574,899, Aug. 25, 1966. This application Sept. 4, 1969, Ser. No. 855,380
Int. Cl. C03c 3/00
U.S. Cl. 117—100
4 Claims

ABSTRACT OF THE DISCLOSURE

Integral sodium orthosilicate and anhydrous sodium sesquisilicate are manufactured as particles of caustic soda encapsulated with anhydrous sodium metasilicate in such a manner that the overall composition is form 1.75–2.5 $Na_2O:SiO_2$ and 1.35–1.65 $Na_2O:SiO_2$, respectively.

---

This is a continuation-in-part of application Ser. No. 574,899 filed Aug. 25, 1966, now abandoned.

It is well known that anhydrous sodium metasilicate is much less hygroscopic, easier to handle, less corrosive to skin and metals and less likely to cake than caustic soda. It has, however, been the general industrial practice to form technical anhydrous sodium sesquisilicate and sodium orthosilicate by compounding caustic soda particles with sodium metasilicate particles, although integral products formed by the reaction of wet caustic soda and sand or other siliceous alkali silicates have been sold. While the integral products are somewhat less corrosive than the compounded mixtures, they are still quite hygroscopic and given to caking on exposure because they are merely aggregates of sodium hydroxide and sodium metasilicate.

It is known to form anhydrous sodium metasilicate by building up seed particles with consecutive layers of new anhydrous sodium metasilicate as described in U.S. Pat. 3,208,822, and it is also known to use liquid caustic as the coat to form compositions with the ratio of orthosilicate. It has occurred to me that the problems associated with the technical sodium orthosilicate and sodium sesquisilicate can be overcome by reversing the procedure and using fine caustic soda particles as seed and coating them with anhydrous sodium metasilicate, thus forming a product with the improved handling characteristics of sodium metasilicate but which would dissolve rapidly in water to provide the cleaning power of the orthosilicate and sesquisilicate in metal cleaning and laundry operations. In a laundry, moreover, particles of my coated caustic soda will be much less likely to burn the fabric before they dissolve in the wash water. These are important improvements over ortho- and sesquisilicate formed by any known prior processes.

My new product has the further advantage of freedom from dust, water insoluble matter, and other impurities associated with the usual sodium metasilicate, as set out in the above Pat. No. 3,208,822. My product is also a dead-white color especially desirable for compounding of cleaners. The particle size and shape is controllabe in the process.

The process of my invention comprises:

(a) Introducing a plurality of small solid particles of caustic soda into a coating zone;
(b) Raising the moving mass of particles of caustic soda substantially to the boiling point of a sodium metasilicate liquor;
(c) Introducing into said caustic zone an aqueous sodium metasilicate liquor;
(d) Causing a liquid film of said metasilicate liquor to envelop at least the major portion of the exterior surface of said small particles of caustic soda;
(e) Maintaining the moving mass of the aforesaid film covered particles above the boiling point of the aqueous sodium metasilicate liquor by applying additional heat so as to cause evaporation of water from said film, thus causing said liquid film to change to a solid film of anhydrous sodium metasilicate; and
(f) Repeating the above coating and film conversion steps any desired number of times until the size of the coated particles is increased to the desired extent.

Thus the addition of successive increments of the sodium metasilicate solution followed by the evaporation on the particle surface provides a particle of a size greater than that of the original seed particle comprising layers of anhydrous sodium metasilicate crystals deposited around a central core of sodium hydroxide. Thus by my process it is possible to produce a product which is substantially less corrosive, dust-free, dense, free of soluble or insoluble impurities, rapidly soluble, resistant to moisture pick-up and caking, and commercially acceptable.

The plurality of initial small particles of caustic soda may be obtained as fine material from the manufacturer or, of course, may be crushed as convenient, and it may be that oversize particles may be crushed and reprocessed provided of course that the proper balance of sodium metasilicate to caustic soda is maintained. For instance, oversize product from the sodium orthosilicate may be crushed and used as a base for the manufacture of the anhydrous sodium sesquisilicate.

In general, we would expect that the preferred particle size of the seed particles would be 48 mesh or smaller.

The coating zone, while not limited to any particular apparatus, preferably consists of a rotating cylinder since this is economical and convenient and readily available. Also, the size is a matter of choice depending on the output and capacity.

I prefer to maintain the seed particles in an agitated state so that the surfaces of the individual particles are turned in different directions during the course of treatment and the final particles tend to be round and evenly coated. The means employed to maintain the pluraliy of particles in the agitated state is not criticle. The possible means are mentioned in the aforementioned patent.

The plurality of small particles of caustic soda is raised to a temperature near, and preferably above, the boiling point of the sodium metasilicate liquor used as the coating solution. Since the system is essentially at atmospheric pressure and the atmosphere in the dryer is preferably 100% steam, that is with the minimum of extraneous air, any particles at a temperature below the boiling point of the saturated metasilicate liquor will tend to condense water from the steam and become wet and eventually sticky or pasty. I have found that if I do maintain the bed at substantially the boiling point of the liquor being added or present as a saturated solution on the particles the bed will remain granular and free-flowing. It is therefore preferable never to add so much liquor at any one point that the temperature of the mass of particles falls below the boiling point of the liquor in contact with the crystal particles. However, additional heat may be applied during this drying step to speed up and complete the dehydration of the film before additional liquor is added to form a new film.

The plurality of small particles, preferably in an agitated state, are contacted with the aqueous sodium metasilicate solution, preferably in the form of a clarified solution. Sodium metasilicate solutions of nearly any desired concentration may be used. It is possible that under some circumstances solutions with a density of 10° Baumé or lower may be available from other processes. On the other hand, it is often desirable to causticize an ordinary liquid sodium silicate of commerce, and these causticized solutions will normally be in the range of 30–55° Baumé. The use of the 55° Baumé sodium metasilicate or a liquid phase of lower gravity is economical since it can be prepared without evaporation of water in a concentration step. It is also preferable to use a liquor of similar gravity since liquors of higher gravity wet the hot caustic particles and the caustic particles already covered with anhydrous sodium metasilicate less readily and they tend to form heavier films which remain sticky and cause aggregation. On the other hand, the use of metasilicate liquors below about 50° Baumé while wetting the hot particles more readily does increase the amount of heat to remove the excess water in drying the film and thus tends to increase the cost of the operation.

The coating solution of the aqueous sodium metasilicate is contacted with the said plurality of small particles in an amount sufficient and for a long enough time to cause said coating solution to cover at least the major proportion of the surface of the said particles. The particles may be coated with the film even up to the point at which the particles would cease to be free-flowing. By maintaining the plurality of particles in an agitated state, the particles are more evenly and uniformly coated with the liquid film. The coating solution is preferably not introduced in such large quantities that gross agglomeration occurs.

Heat is preferably applied to the moving or agitated mass of particles by a stream of heated gas. The film or coating of hydrous sodium metasilicate is thus dehydrated so as to thereby form a solid film or coating on the surface of the particles.

The hot gases are preferably free of $CO_2$ or other acidic components as these tend to react and form salts with the alkali ions and the metasilicate. I prefer to use superheated steam as the heating gas as they may be recycled again and again with part of the water vapor removed in each cycle. By using steam I avoid renewing $CO_2$ or other impurities in the drying gas. However, it has been found that sodium metasilicate does not take up $CO_2$ to any extent above 200° C. and therefore one may use gases contaminated with $CO_2$ at temperatures above about 200° C.

During the drying process using superheated steam the particles remain at the boiling point of the liquor (about 100–180° C.) until most of the water is evaporated. At low moisture contents, the particles may go considerably above the boiling point and, in general, I find a free-flowing condition is maintained if the observed temperature of the bed in the container is above about 130° C. and below the melting point of the anhydrous metasilicate.

When a dry $CO_2$ free gas is employed water will of course be removed below the boiling point of the liquor as will be obvious to those skilled in the art. I consider such procedures as equivalent processes.

Successive coatings or films may be formed on the solid particles by repeating the steps outlined above. The size of the final particles is therefore only governed by the number of coatings which the particles receive. Naturally, some particles will exhibit more than one center of growth as a small amount of agglomeration may occur even under the best conditions of operation, but essentially my process is one of coating individual particles and I desire to avoid aggregation insofar as I may.

By suitable control of the pitch, internal cylinder structure, loading rate, rotating speed, or other mixing speed, temperatures and feed and discharge rates it is possible to control the particles size and production rate of a commercially desirable product in a continuous operation. This product may then be screened and sized and the oversized particles crushed and combined with finer particles for return to the process.

It is only necessary to control the relative amounts of caustic soda and sodium metasilicate liquor in order to maintain the desired ratio of $Na_2O$ to $SiO_2$ in the final product. Therefore, if one desires to form, for instance, sodium orthosilicate, one may start with somewhat larger particles of caustic soda and apply less sodium metasilicate coating than would be required for forming the sodium sesquisilicate. It is thus merely a matter of practice, experience and calculation to balance the initial particle size of the caustic soda and the amount of sodium metasilicate liquor which will need to be applied to these particles to provide the final product of sodium orthosilicate having a ratio of 1.75–2.25 $Na_2O:1SiO_2$ or a sodium sesquisilicate having a ratio of 1.35–1.65 $Na_2O:1SiO_2$. Naturally, should one desire, it is quite possible to form products either between these stated ratios or even more alkaline or less alkaline should products of these compositions be required for any purpose. Thus products having ratios at least as alkaline as $3Na_2O:SiO_2$ and at least as siliceous as $1.25\ Na_2O:1.0SiO_2$ may be made by my process.

The following example is illustrative of the preferred embodiments of the present invention. It should be understood that the example is not intended to limit the invention and that obvious changes may be made by those skilled in the art without changing the essential characteristics and the basic concept of the invention. The parts and percentages are by weight, the temperature is room temperature and the pressure is atmospheric unless otherwise indicated. The mesh and mesh sizes mentioned refer to Tyler Standard Screen Scale Sieves.

A technical anhydrous sodium hydroxide having a particle size of less than 65 mesh was used as the seed. An anhydrous sodium metasilicate at about 50° Baumé was coated on the seed particles forming primarily products in the range of 20–48 mesh and having an overall ratio when dissolved in water of that of sodium orthosilicate. The incoming gas at the discharge end had a temperature of about 325° C. and the product itself was at about 195° C.

The product was found to have an excellent dead-white color, with practically no fines less than 65 mesh, and a very low insoluble content much below that of the usual commercial sodium metasilicate. The particles were spherical and had resistance to the formation of dust even when agitated. Further details on the method of operation and the equipment which may be used for this operation are detailed in the above-mentioned patent.

The product of the invention had a rapid uniform dissolving rate in water. The particles were of uniform size and globular shape. Little or no dust was formed in handling the product and therefore was little or no nasal irritation during handling. The product had a higher purity because of the reduction in the $CO_2$ and other content. There was little or no size separation during handling and shipment. Only a simple screening step was required to obtain a product within narrow size range. The particles had little or no tendency to cake or lump; the insoluble matter per unit weight approached zero; the product had a desirable dead-white color, and it was readily mixable with other cleaning chemicals to produce uniformly sized cleaning compositions.

The technical anhydrous caustic soda may be encased or encapsulated in a coating of anhydrous sodium metasilicate in the amount necessary to provide an overall mole ratio such as that of sodium sesquisilicate i.e. 1.35–1.65 $Na_2O:1SiO_2$ or sodium orthosilicate i.e. 1.75–2.25 $Na_2O:1SiO_2$. In this way the final product has a resistance to caking, to attrition, and to high humidity typical of the anhydrous sodium metasilicate and yet the product dissolves easily forming a solution having a sesquisilicate or orthosilicate ratio useful in laundry and metal cleaning operations, and has the advantage of being an integral composition compared to the standard mechanical mixtures.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obivous equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letter Patent is intended to cover all such modifications, changes and substitutions as would reasonably fall within the scope of the appended claims.

What I claim is:

1. The process of encapsulating caustic soda with sodium metasilicate which comprises carrying out the following steps:
   (a) introducing a plurality of small solid particles which consist essentially of caustic soda into a coating zone;
   (b) raising the moving mass of particles of caustic soda substantially to the boiling point of the sodium metasilicate liquor;
   (c) introducing into said coating zone an aqueous sodium metasilicate liquor;
   (d) causing a liquid film of said metasilicate liquor to envelope at least the major portion of the exterior surface of said small particles of caustic soda;
   (e) maintaining the temperature of the moving mass of the aforesaid film covered particles above the boiling point of the aqueous sodium metasilicate liquor by applying additional heat so as to cause evaporation of water from said film, thus causing said liquor film to change to a solid film of anhydrous sodium metasilicate; and
   (f) repeating the above coating and film conversion steps any desired number of times until the size of the coated particles is increased to the desired extent.

2. Integral products of coated caustic soda consisting essentially of caustic soda encapsulated with anhydrous sodium metasilicate having an overall ratio of from 3 $Na_2O:SiO_2$ to 1.25 $Na_2O:1SiO_2$.

3. The product of claim 2 in the form of technical sodium orthosilicate having the final overall ratio between 1.75 to 2.25 $Na_2O:1SiO_2$.

4. The product of claim 2 in the form of technical sodium sesquisilicate in which the final overall ratio is between 1.35 and 1.65 $Na_2O:1SiO_2$.

References Cited

UNITED STATES PATENTS

| | | | |
|---|---|---|---|
| 3,447,950 | 6/1969 | Evans et al. | 117—100 |
| 3,301,636 | 1/1967 | Otrhalek | 117—100X |
| 3,255,036 | 6/1966 | Kramer et al. | 117—100X |
| 3,208,823 | 9/1965 | Baker et al. | 117—100X |
| 3,208,822 | 9/1965 | Baker et al. | 117—100X |
| 3,074,802 | 1/1963 | Alexander et al. | 117—100X |
| 3,059,996 | 10/1962 | Pohl et al. | 117—100X |

MURRAY KATZ, Primary Examiner

M. R. P. PERRONE, Jr., Assistant Examiner

U.S. Cl. X.R.

117—118